(12) United States Patent
Holmberg et al.

(10) Patent No.: US 7,590,836 B1
(45) Date of Patent: Sep. 15, 2009

(54) METHOD AND SYSTEM FOR RECOVERING THE CONFIGURATION DATA OF A COMPUTER SYSTEM

(75) Inventors: Richard Holmberg, Austin, TX (US); Juan Diaz, Norcross, GA (US); Anand Joshi, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 464 days.

(21) Appl. No.: 11/504,427

(22) Filed: Aug. 15, 2006

Related U.S. Application Data

(62) Division of application No. 10/608,253, filed on Jun. 27, 2003, now Pat. No. 7,117,348.

(51) Int. Cl.
*G06F 15/177* (2006.01)
*G06F 9/00* (2006.01)
*G06F 1/24* (2006.01)
*G06F 3/00* (2006.01)

(52) U.S. Cl. .............. 713/1; 713/2; 713/100; 710/8

(58) Field of Classification Search ........ 713/1, 713/2, 100
See application file for complete search history.

(56) References Cited

U.S. PATENT DOCUMENTS

| | | | |
|---|---|---|---|
| 5,822,581 A | 10/1998 | Christeson | |
| 5,982,899 A | 11/1999 | Probst | |
| 6,564,369 B1 * | 5/2003 | Hove et al. | 717/121 |
| 6,711,676 B1 | 3/2004 | Zomaya et al. | |
| 6,748,524 B1 | 6/2004 | Stepp et al. | |
| 6,836,657 B2 | 12/2004 | Ji et al. | |
| 6,854,052 B2 | 2/2005 | Beeston et al. | |
| 6,990,577 B2 * | 1/2006 | Autry | 713/100 |

* cited by examiner

*Primary Examiner*—Thomas Lee
*Assistant Examiner*—Ji H Bae
(74) *Attorney, Agent, or Firm*—Hope Baldauff Hartman, LLC

(57) ABSTRACT

Methods and systems are provided for recovering configuration data in a computer system. According to one method, a device is selected as a current device. A first map location is retrieved from a layout of present configuration data stored in a computer system. Next, a second map location is retrieved from a layout of updated configuration data stored in the computer system for the current device. A determination is then made as to whether the first map location matches the second map location for the current device. If it is determined that the first map location matches the second map location for the current device, then the next hardware device in the set of devices is selected as the current device. If it is determined that the first map location does not match the second map location for the current component, then the present configuration data is copied from the first map location to the second map location in an NVRAM, the present configuration data is erased from the first map location in the NVRAM, and the next hardware device in the set of devices is selected as the current device.

15 Claims, 5 Drawing Sheets

SETUP QUESTION DATABASE V 1.0  {#h-50}

| HANDLE | SETUP QUESTIONS | #OPTIONS | #BITS | SETUP VALUE | MAP POSITION |
|---|---|---|---|---|---|
| 1 | BOOT DEVICE | 16 | 4 | 3 | 70:0-3 |
| 2 | SERIAL PORT | 5 | 3 | 2 | 70:4-6 |
| 3 | USB KEYBOARD | 2 | 1 | 1 | 70:7 |

*FIG. 2A*

SETUP QUESTION DATABASE V 1.1  {#h-60}

| HANDLE | SETUP QUESTIONS | #OPTIONS | #BITS | SETUP VALUE | MAP POSITION |
|---|---|---|---|---|---|
| 1 | BOOT DEVICE | 16 | 4 | 1 | 70:0-3 |
| 2 | SERIAL PORT | 9 | 4 | 1 | 71:0-3 |
| 3 | USB KEYBOARD | 2 | 1 | 1 | 70:7 |

*FIG. 2B*

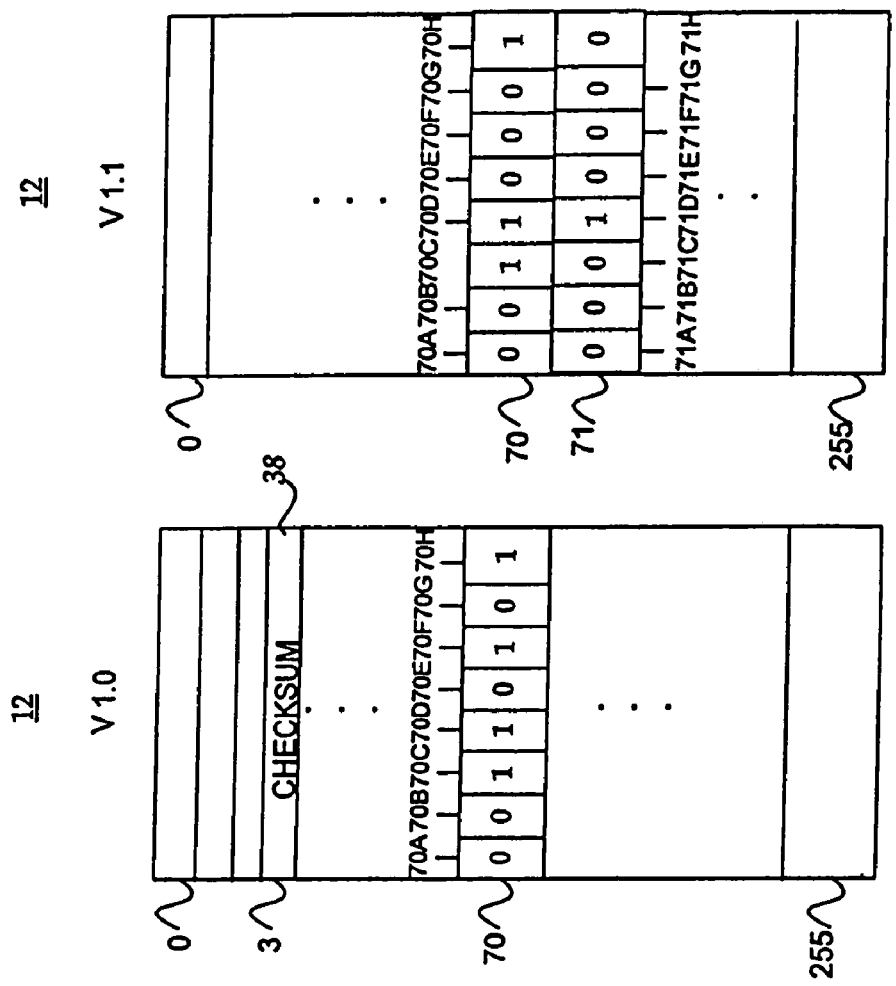

METHOD AND SYSTEM FOR RECOVERING THE CONFIGURATION DATA OF A COMPUTER SYSTEM

CROSS-REFERENCE TO RELATED APPLICATIONS

This application is a divisional application of U.S. Pat. No. 7,117,348 filed on Jun. 27, 2003 and entitled "Method and System for Detecting the Validity of Configuration Data," which is expressly incorporated herein by reference in its entirety.

TECHNICAL FIELD

The present invention is related to computer system configuration. More particularly, the present invention is related to recovering configuration data in a memory device in a computer system.

BACKGROUND

Some computer systems have a type of non-volatile memory ("NVRAM") for storing user-configurable settings governing the operation of a computer. For example, a user may configure a computer system to boot from the hard disk or boot from a network. The user-configurable settings for the computer system are typically provided in a firmware basic input/output system ("BIOS"). The BIOS contains basic routines which are accessed to boot the computer as well as to initialize and interface hardware with operating system software.

Occasionally, the BIOS may need to be updated to reflect changes in the hardware configuration of the computer system or to add new features. When the BIOS in a computer system is updated, the software that performs the update resets the configuration settings stored in the NVRAM to their default state requiring a user to reconfigure the previous settings in the NVRAM which were deleted as a result of the update. Historically, this reset has been done as a safety measure because different BIOS versions may have different configurable features whose current state is stored in the same locations in the NVRAM. Thus, the configuration reset is done to avoid a potentially serious system malfunction. However, rarely does an updated BIOS version include different configurable features which are stored in the same NVRAM locations as the features provided in a previous BIOS version. As a result, a user's previous configuration settings in the NVRAM are often reset unnecessarily due to a BIOS update and, as a result, many users are unnecessarily required to reconfigure their configuration settings.

It is with respect to these considerations and others that the present invention has been made.

SUMMARY

In accordance with the present invention, the above and other problems are solved by methods for recovering configuration data stored in the NVRAM of a computer system. In accordance with aspects, the present invention relates to a method of recovering configuration data for a set of hardware devices in a computer system. A hardware device is selected from the set of devices as a current device. Next, a first map location is retrieved from a layout of present configuration data stored in the computer system. The first map location represents the location of present configuration data for the current device in the NVRAM. Next, a second map location is retrieved from a layout of updated configuration data stored in the computer system for the current device. The second map location represents the location of updated configuration data for the current device in the NVRAM.

Next, a determination is made as to whether the first map location matches the second map location for the current device. If it is determined that the first map location matches the second map location for the current device, then the next hardware device in the set of devices is selected as the current device. If it is determined that the first map location does not match the second map location for the current component, then the present configuration data is copied from the first map location to the second map location in the NVRAM, the present configuration data is erased from the first map location in the NVRAM, and the next hardware device in the set of devices is selected as the current device.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIGS. 2A-2B illustrate tables showing illustrative layouts of the hardware configuration of the computer system of FIG. 1 according to various embodiments of the invention;

FIGS. 3A-3C illustrate block diagrams showing configuration data stored in NVRAM in the computer system of FIG. 1 according to various embodiments of the invention;

DETAILED DESCRIPTION

Figure 1:
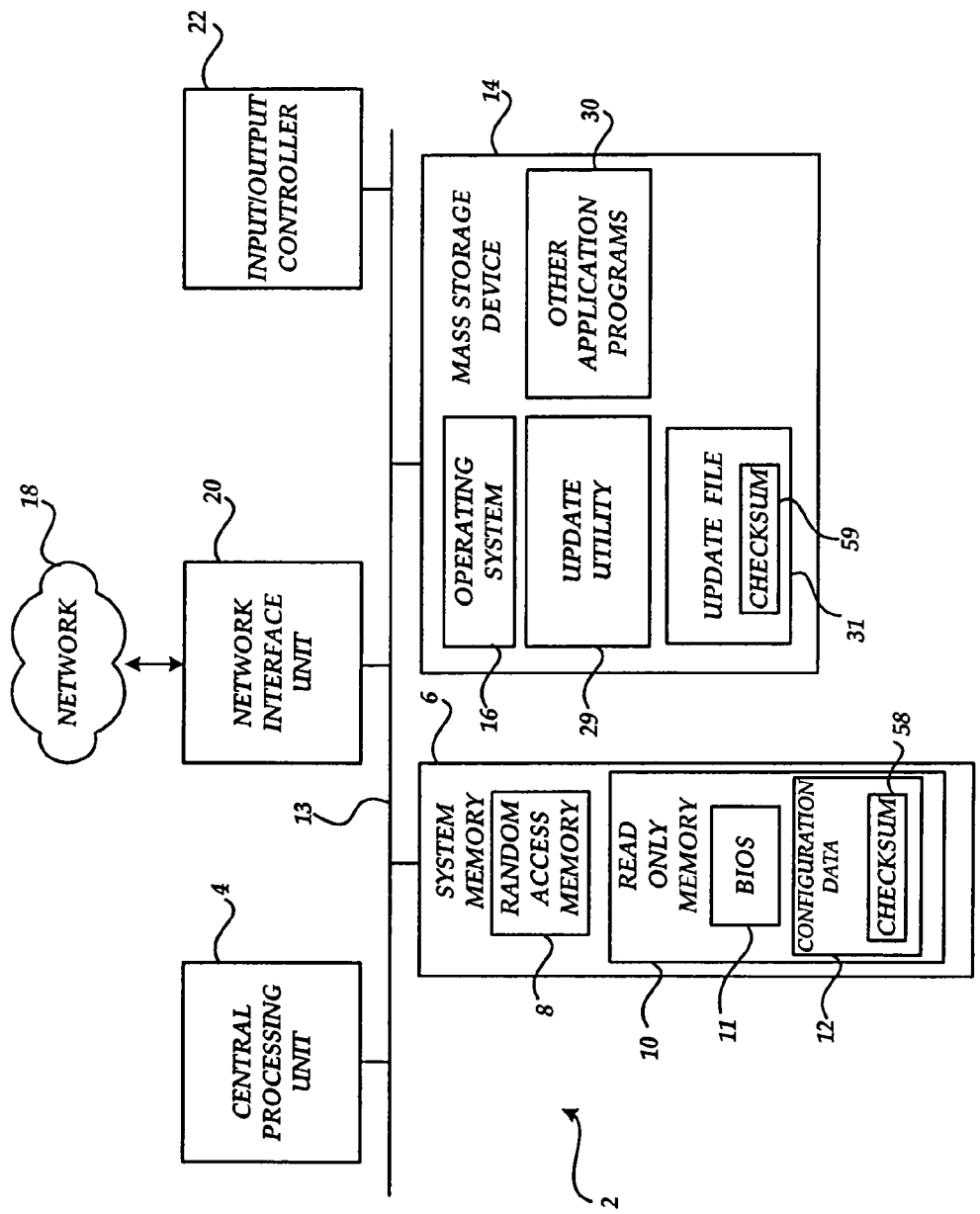
FIG. 1 illustrates a computer system architecture for detecting valid configuration data and recovering configuration data in a computer system utilized in embodiments of the invention.

Embodiments of the present invention provide methods for detecting the validity of configuration data and recovering configuration data in a computer system. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

FIG. 1 and the following discussion are intended to provide a brief, general description of a suitable computing environment in which the invention may be implemented. While the invention will be described in the general context of program modules that execute in conjunction with an application program that runs on an operating system on a computer system, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a computer system 2 which was discussed briefly above, for practicing the various embodiments of the invention will be described. The computer system 2 includes a standard local or server computer operative to execute one or more application programs, such as update utility 29.

Alternatively, the computer system 2 may include another type of computing device operative to access a network 18, such as a personal digital assistant or other type of computer. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 13 that couples the system memory 6 to the CPU 4.

The ROM 10 comprises a memory device for storing a basic input/output system ("BIOS") 11 containing the basic routines that help to transfer information between elements within the computer. These basic routines are accessed to boot the computer as well as to initialize and interface hardware with operating system software. One such routine is the power-on self test ("POST") routine. The POST routine is executed after the computer system is turned on for performing diagnostics and initializing system components in the computer system. The ROM 10 further comprises a second memory device, such as a non-volatile random access memory device ("NVRAM") 12, for storing configuration data for the hardware in the computer system 2. It will be appreciated by those skilled in the art that the NVRAM 12 may be, for example, a complementary metal oxide semiconductor ("CMOS") or a static random access memory ("SRAM") device. In one embodiment, the configuration data stored in the NVRAM 12 may include a layout checksum 58, which is a computed value representing a current hardware configuration or layout of the computer system 2. The layout checksum 58 will be described in greater detail below with respect to FIGS. 2-3. The contents of the NVRAM 12 will be described in greater detail below with respect to FIGS. 2-4 below.

The computer system 2 further includes a mass storage device 14 for storing an operating system 16, an update utility 29, an update file 31, and other application programs 30. The update utility 29 contains program code for updating an existing version of the BIOS 11 to an updated version with update code in the update file 31. The update utility 29 is launched from the mass storage device 14 on the CPU 4 which executes code for updating the BIOS 11 with the update code. Upon launching the update utility 29 the update file 31 is loaded into the RAM 8. In one embodiment, the updated BIOS code in the update file 31 may include a layout checksum 59, which is a computed value representing an updated hardware configuration or layout of the configuration data stored in the NVRAM 12 of the computer system 2. In another embodiment, the update file 31 may include updated configuration data describing the hardware configuration of the computer system 2. The update utility 29 and the update file 31 will be described in greater detail with respect to FIGS. 5-6 below.

The mass storage device 14 is connected to the CPU 4 through a mass storage controller (not shown) connected to the bus 13. The mass storage device 14 and its associated computer-readable media, provide non-volatile storage for the computer system 2. Although the description of computer-readable media contained herein refers to a mass storage device, such as a hard disk or CD-ROM drive, it should be appreciated by those skilled in the art that computer-readable media can be any available media that can be accessed by the computer system 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer system 2 may operate in a networked environment using logical connections to remote computers through the network 18. The computer system 2 may connect to the network 18 through a network interface unit 20 connected to the bus 13. It should be appreciated that the network interface unit 20 may also be utilized to connect to other types of networks and remote computer systems. The computer system 2 may also include an input/output controller 22 for receiving and processing input from a number of devices, including a keyboard, mouse, or electronic stylus (not shown in FIG. 1). Similarly, an input/output controller 22 may provide output to a display screen, a printer, or other type of output device. It should be understood that the input/output controller 22 may be a serial port interface (not shown) or other type of interface, such as a game port or a universal serial bus (USB), that is coupled to the bus 13.

FIGS. 2A-2B are tables showing illustrative layouts of the hardware configuration of the computer system 2 according to various embodiments of the invention. The table shown in FIG. 2A is a setup control database 50 illustrating the hardware configuration in the computer system 2 for a current version of the BIOS 11. As shown in FIG. 2A the current BIOS version is version 1.0. The setup control database 50 is stored in the computer system 2. The setup control database 50 allows a user to access the contents of the NVRAM 12 to setup or configure hardware devices in the computer system 2 (such as specifying a hard disk drive or memory configuration) during boot-up of the computer system 2 by the BIOS 11.

The setup control database 50 includes a Handles column 51 which lists numbers assigned to each of the configurable hardware devices in the computer system 2. As is known to those skilled in the art, a handle is a token, typically a pointer, that points a memory location. Each handle in the setup control database 50 points to memory addresses in the NVRAM 12 for each of the configurable hardware devices. The memory addresses for each of the devices are shown in Map Position column 56. The setup control database 50 further includes a Setup Question column 52 which lists the configurable hardware devices for the computer system 2. For example, in the setup control database 50 of FIG. 2A, the configurable hardware devices are a boot device 52A, a serial port 52B, and a USB keyboard 52C.

The setup control database 50 further includes an Options column 53 listing the number of options available for each of the configurable hardware devices listed in the Setup Question column 52. For example, the Options column 53 indicates that the boot device 52A has sixteen configurable options for booting the computer system 2. For example, one option may be booting the computer from the hard disk while another option may be booting the computer from the CD-ROM drive.

The setup control database 50 further includes a Bits column 54 listing the number of binary bits in the NVRAM 12 allocated to each of the configurable hardware devices listed in the Setup Questions column 52. It should be understood that the number of binary bits allocated for each device in the Bits column 54 corresponds to the number of options for each device in the Options column 53. For example, the boot device 52A is configured to have sixteen options and requires four binary bits to represent all sixteen options in the NVRAM 12.

The setup control database 50 further includes a Setup Value column 55 listing a setup value for each of the configurable hardware devices in the computer system 2. Each setup value may be a default value or a value selected by a user of the computer system 2. For example, in the setup control database 50, the serial port 52B has a setup value of two indicating, for example, that the serial port in the computer system 2 is assigned the second communications port (i.e., "COM2").

The setup control database 50 further includes a Map Position column 56 listing the memory addresses in a "map" of the NVRAM 12 for each of the devices listed in the Setup Questions column 52. Each memory address in the Map Position column 56 corresponds to a byte and bit location in the map for each device. For example, the configuration data for the boot device 52A, which is allocated four bits in the Bits column 54, is located in byte 70, bits 0-3 (70:0-3) in the map of the NVRAM 12. The map of the NVRAM 12 will be described in greater detail below with respect to FIGS. 3A-3B below.

Referring now to FIG. 2B, the table shown in FIG. 2B is a setup control database 60 illustrating the hardware configuration for the boot device 52A, the serial port 52B, and the USB keyboard 52C in the computer system 2 for an updated version of the BIOS 11. As briefly discussed above, the update file 31 may include updated BIOS code and updated configuration data describing the hardware configuration of the computer system 2. In this example, the updated version of the BIOS 11 is version 1.1. Similar to the setup control database 50 described above in FIG. 2A, the setup control database 60 includes a Handle column 61, a Setup Questions column 62, an Options column 63, a Bits column 64, a Setup Value column 65, and a Map Position column 66. As shown in FIGS. 2A and 2B, the number of options for the serial port 52B has increased from five options in the setup control database 50 to nine options in the setup control database 60. The increase in the number of options may be, for example, an increase in the number of COM ports assignable to the serial port 52B in the updated BIOS version. As a result of the increase in the number of options, the number of binary bits allocated to the serial port 52B has increased from three bits in the setup control database 50 to four bits in the setup control database 60. As shown in FIG. 2B, the memory addresses for the serial port 52B in the Map Position column 66 have also changed from byte 70, bits 4-6 (70:4-6) in the setup control database 50 to byte 71, bits 0-3 (71:0-3) in the setup control database 60.

FIGS. 3A-3B are block diagrams illustrating the configuration data stored in the NVRAM 12 in the computer system 2 described above in FIGS. 1-2, according to various embodiments of the invention. Referring now to FIG. 3A, the configuration data in the NVRAM 12 corresponds to a current version of the BIOS 11 (i.e., v 1.0) in the computer system 2. As shown in FIG. 3A, the NVRAM 12 includes 256 bytes of memory with the configuration data being stored in byte 70. The byte 70 includes bits 70A-70H for storing the current configuration for the hardware devices 52A, 52B, and 52C in the setup control database 50 in binary format. For example, the Map Position column 56 in the setup control database 50 allocates the configuration data for the serial port 52 to byte 70, bits 4-6 with a setup value of two. As shown in FIG. 3A, the bits 70E-70G in the byte 70 store the configuration for the serial port 52B with a setup value (i.e., binary value) equal to two. In one embodiment of the invention and as briefly described above, the NVRAM 12 may also include a layout checksum 58, which is a computed value representing the layout or contents of the NVRAM 12. The layout checksum 58 may be stored in a fixed location in the NVRAM 12 such as the byte 38.

It will be appreciated by those skilled in the art that the layout checksum 58 may be computed as a hash value generated from the records stored in the setup control database 50. For example, the layout checksum 58 may be generated from the values in the Handles column 51 and the Map Position column 56 in the setup control database 50. It should be understood that methods for computing hash values from data records are known to those skilled in the art and that other methods for computing the layout checksum 58 may also be utilized without departing from the scope of the present invention.

Referring now to FIG. 3B, the NVRAM 12 is shown corresponding to an updated version of the BIOS 11 (i.e., v 1.1) in the computer system 2. As shown in FIG. 3B, the updated NVRAM 12 includes 256 bytes of memory with the updated configuration data being stored in the bytes 70 and 71. The byte 70 includes bits 70A-D and 70H for storing the updated configuration for the boot device 52A and the USB keyboard 52C while the byte 71 includes bits 71A-71D for storing the updated configuration for the serial port 52B in binary format. For example, the Map Position column 66 in the setup control database 60 allocates the configuration data for the serial port 52B to byte 71, bits 0-3 with a default setup value of one. As shown in FIG. 3B, the bits 71A-71D in the byte 71 store the configuration for the serial port 52B with a setup value (i.e., binary value) equal to one. As briefly described above, in an alternative embodiment, the update file 31 may only include the layout checksum 59 which may be a hash value generated from the values in the Handles column 61 and the Map Position column 66 in the setup control database 60.

Figure 4:
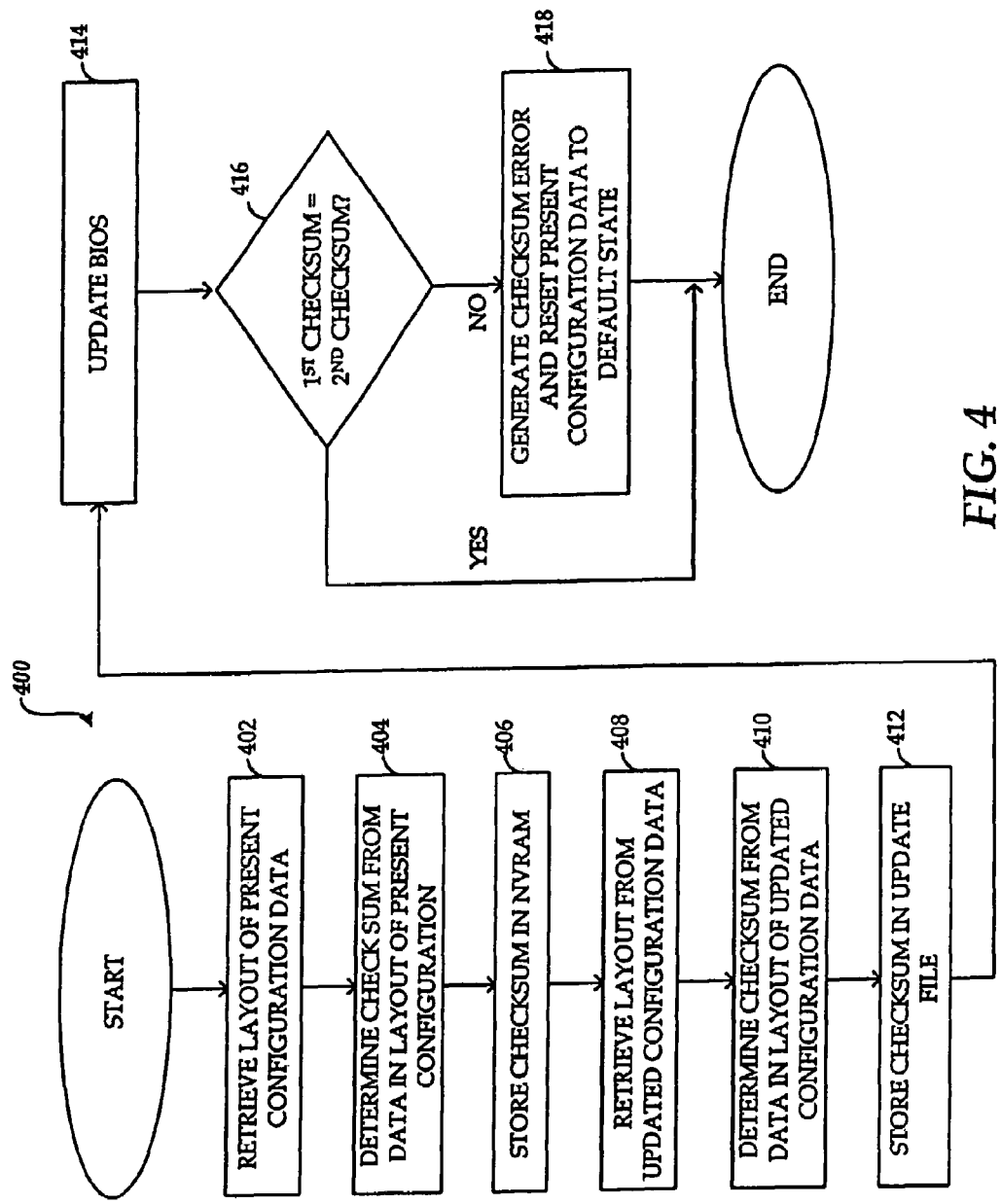
FIG. 4 illustrates logical operations performed in the computer system of FIG. 1 for detecting the validity of configuration data according to an embodiment of the invention.
Figure 5:
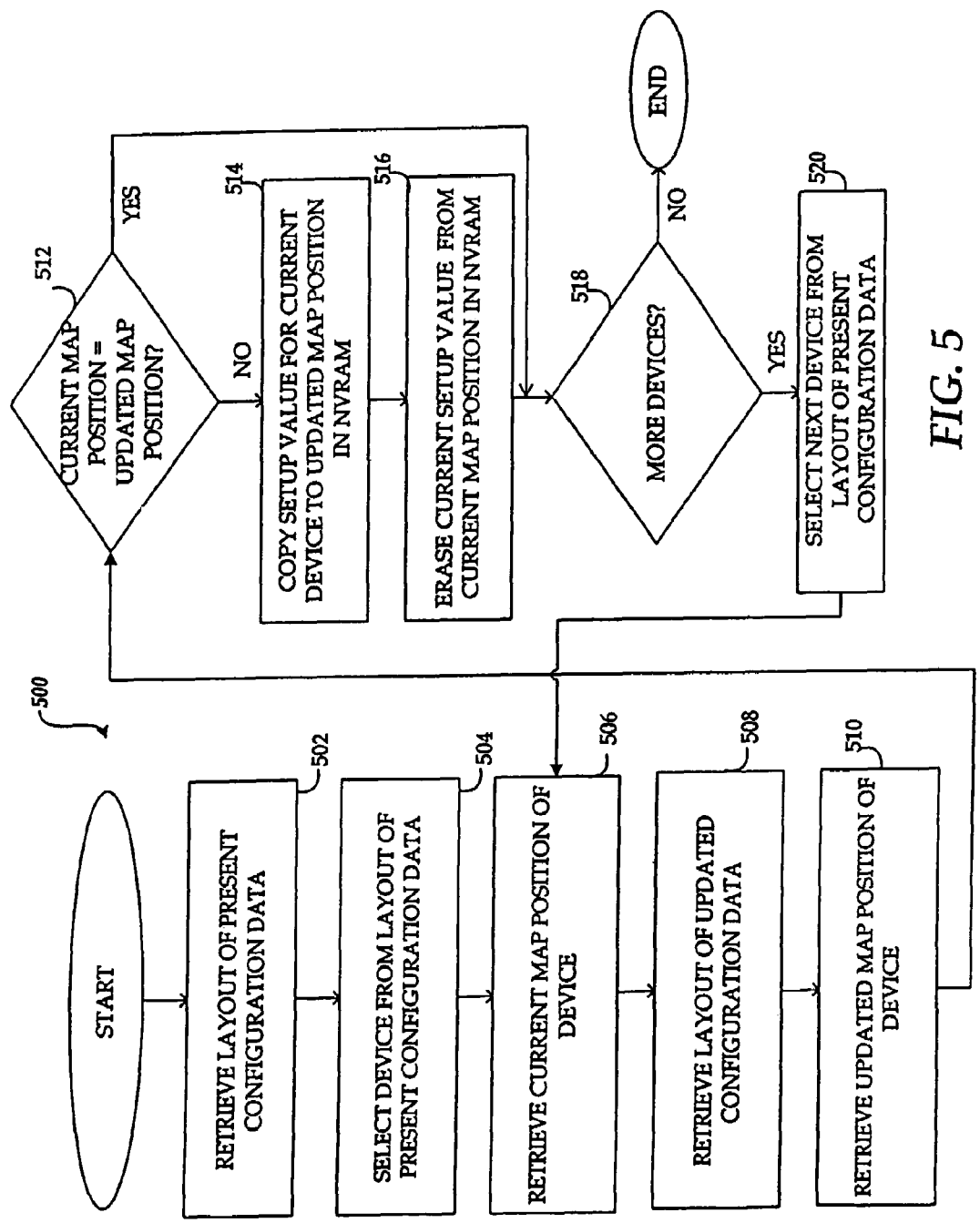
FIG. 5 illustrates logical operations performed in the computer system of FIG. 1 for recovering configuration data according to an alternative embodiment of the invention.

FIGS. 4-5 shows illustrative logical operations performed in the computer system 2 for detecting the validity of configuration data and recovering configuration data in the NVRAM 12 described above in FIGS. 1-3 according to various embodiments of the invention. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The logical operations 400 of FIG. 4 begin at operation 402 where the update utility 29 is launched in the computer system 2 and retrieves the layout of the present configuration data for the computer system 2. As described above in FIG. 2A, the layout of the present configuration data is the setup control database 50 for the current version of the BIOS 11 (i.e., v. 1.0) which is stored in the computer system 2. After the layout of the present configuration data has been retrieved, the operational flow 400 continues at operation 404 where the update utility 29 determines the layout checksum 58 from the records in the setup control database 50. As described above with respect to FIG. 3A, the layout checksum 58 may be determined by generating a one-byte hash value from the values in the Handles column 51 and the Map Position column 56 in the setup control database 50.

After the first layout checksum has been determined at operation 404, the operational flow 400 continues at operation 406 where the update utility 29 stores the layout checksum 58 in a fixed location, such as the byte 38, in the NVRAM 12 as shown above in FIG. 3A. It should be understood that, in an alternative embodiment of the invention, the layout checksum 58 may be determined prior to the BIOS 11 being compiled in the computer system 2. In this alternative embodiment, the layout checksum is hard-coded into the NVRAM 12 when the BIOS code is compiled in the computer system 2.

After the layout checksum 58 has been stored in the NVRAM 12, the operational flow 400 continues at operation 408 where the update utility 29 retrieves the layout of the updated configuration data for the computer system 2 from the update file 31. As briefly described above, the layout of the updated configuration data is the setup control database 60 for the updated version of the BIOS 11 (i.e., v. 1.1) which may be stored in the update file 31 in the computer system 2.

After the layout of the updated configuration has been retrieved at operation 408 the operational flow 400 continues at operation 410 where the update utility 29 determines the layout checksum 59 from the records in the setup control database 60. As described above, the layout checksum 59 may be determined by generating a one-byte hash value from the values in the Handles column 61 and the Map Position column 66 in the setup control database 60. After the layout checksum 59 has been determined at operation 408, the operational flow 400 continues at operation 412 where the update utility 29 stores the layout checksum 59 in the update file 31. It should be understood that the layout checksum 59 may be stored in the code containing the updated configuration data for the NVRAM 12. It should be understood that, in an alternative embodiment of the invention, the layout checksum 59 may be pre-determined and inserted into the updated BIOS code prior to launching the update utility 29.

After the layout checksum 59 has been stored in the update file 31 at operation 412, the operational flow 400 continues at operation 414 where the update utility 29 updates the BIOS 11 with the updated code in the update file 31 which contains the layout checksum 59. After the BIOS 11 has been updated at operation 414, the operational flow 400 continues at operation 416 where the layout checksum 58 stored in the NVRAM 12 is compared to the layout checksum 59 stored in the updated code in the BIOS 11. In one embodiment, the comparison may be performed by the POST routine during a boot of the computer system 2 following the update of the BIOS 11. As briefly discussed above, the POST routine performs diagnostics and initializes system components in the computer system including comparing data stored in the BIOS with data stored in the NVRAM 12.

If at operation 416 it is determined that the layout checksum 58 is not equal to the layout checksum 59, the BIOS update has caused a change in the configuration data and a layout checksum error is generated in the computer system 2 at operation 418. Once a layout checksum error is generated the BIOS 11 clears the layout checksum 58 from the NVRAM 12 and resets the configuration options in the NVRAM 12 to their default state. The operational flow 400 then ends. If however, at operation 416 it is determined that the layout checksum 58 is equal to the layout checksum 59, the BIOS update has not caused a change in the configuration data and the configuration data in the NVRAM 12 is left unchanged by the BIOS 11 at operation 418. The operational flow 400 then ends.

FIG. 5 shows illustrative logical operations 500 performed in the computer system 2 for recovering configuration data in the NVRAM 12 described above in FIGS. 1-3 according to an alternative embodiment of the invention. The logical operations 500 of FIG. 5 begin at operation 502 where the update utility 29 is launched in the computer system 2 and retrieves the layout of the present configuration data for the computer system 2. As described above in FIG. 2A, the layout of the present configuration data is the setup control database 50 for the current version of the BIOS 11 (i.e., v. 1.0) which is stored in the computer system 2.

After the layout of the present configuration data has been retrieved, the operational flow 500 continues at operation 504 where the update utility 29 selects a hardware device from the Setup Questions column 52 in the layout. After a hardware device has been selected at operation 504, the operational flow continues at operation 506 where the update utility 29 retrieves the current position of the current device in the NVRAM 12 from the Map Position column 56 in the setup control database 50. After the position of the current hardware device has been retrieved at operation 506, the operational flow 500 continues at operation 508 where the update utility 29 retrieves the layout of the updated configuration data for the computer system 2. As described above in FIG. 2B, the layout of the updated configuration data is the setup control database 60 for the updated version of the BIOS 11 (i.e., v. 1.1) which may be stored in the update file 31.

After the layout of the updated configuration data has been retrieved at operation 508, the operational flow 500 continues at operation 510 where the update utility 29 retrieves the updated map position of the current device in the NVRAM 12 from the Map Position column 66 in the setup control database 60. As discussed above, the setup control database 60, which contains the updated configuration data for the NVRAM 12, may be stored in the update file 31. After the updated map position of the current hardware device has been retrieved from the setup control database 60, the operational flow 500 continues at operation 512 where the update utility 29 compares the current map position for the current device as shown in FIG. 3A to the updated map position for the current device as shown in FIG. 3B.

If at operation 512 it is determined that the current map position of the current hardware device is not equal to the updated map position of the current hardware device, then a change in the configuration of the current hardware device has occurred and the update utility 29 copies the setup value for the current hardware device from the current map position in the NVRAM 12 to the updated map position in the NVRAM 12 at operation 514. In this manner, the current setup for the current hardware device is recovered into the updated configuration data for the NVRAM 12. The operational flow then continues to operation 516 where the update utility 29 erases the current setup value for the current hardware device from the current map position in the NVRAM 12.

For example, as shown in the setup control database 50 in FIG. 2A, the serial port 52B has a current map position of byte 70, bits 4-6 (70:4-6) and a current setup value of 2, which may indicate, for example, that the serial port is currently assigned the second communications port (i.e., COM 2) in the computer system 2. In this example, the serial port 52B also has a map position of byte 71, bits 0-3 (71:0-3) in the updated configuration data with a default setup value of 1 as shown in the setup control database 60 of FIG. 2B. Since the current map position for the serial port 52B is not the same as the updated map position, the update utility 29 copies the current setup value for the serial port 52B from byte 70, bits 4-6 in the NVRAM 12 (represented in binary number format as 010 in FIG. 3A) to the updated map position of byte 71, bits 0-3 in the NVRAM 12 (represented in binary number format as 0010 in FIG. 3C). Thus, the current setup for the serial port 52B is recovered into the updated configuration data for the NVRAM 12. The operational flow then continues from operation 516 to operation 518.

If at operation 512 it is determined that the current map position of the current hardware device is equal to the updated map position of the current hardware device, then no change in the configuration of the current hardware device has occurred and the NVRAM 12 is left unchanged. For example, as shown in the setup control database 50 in FIG. 2A, the current map positions for the boot device 52A and the USB keyboard 52C are the same as the updated map positions for these devices. Therefore, the setup values for these devices are left unchanged in the NVRAM 12 by the update utility 29. The operational flow then continues from operation 512 to operation 518.

At operation 518, the update utility 29 determines whether there are any additional devices to be selected in the setup control database 50. If, at operation 518, it is determined that there are additional devices to be selected in the setup control database 50, the operational flow 500 continues to operation 520 where the update utility selects the next device listed in the Setup Questions column 51 in the setup control database 50. The operational flow 500 then returns to operation 506 where the update utility retrieves the map location of the selected device from the setup control database 50. If, at operation 518, it is determined that there are no additional devices to be selected in the setup control database 50, the operational flow 500 then ends.

Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. A method of recovering configuration data for a plurality of components in a computer system, the method comprising:
   (a) selecting one of the plurality of components as a current component;
   (b) retrieving a first map location in a memory device of the computer system, the first map location representing the location of present configuration data for the current component;
   (c) retrieving a second map location in the memory device of the computer system, the second map location representing the location of updated configuration data for the current component;
   (d) determining whether the first map location is the same as the second map location for the current component;
   (e) if the first map location matches the second map location for the current component, then selecting the next component in the plurality of components as the current component;
   (f) if the first map location does not match the second map location for the current component, then:
      copying the present configuration data to the second map location in the memory device;
      erasing the present configuration data from the first map location in the memory device; and
      selecting the next component in the plurality of components as the current component; and
   (g) repeating the operations (b)-(f) for each of the plurality of components in the computer system.

2. The method of claim 1, wherein the present configuration data for the current component comprises a current setup value for the current component in the computer system.

3. The method of claim 2, wherein copying the present configuration data to the second map location in the memory device comprises copying the current setup value for the current component to the second map location in the memory device.

4. The method of claim 1, wherein retrieving a first map location in a memory device of the computer system comprises:
   retrieving a current layout from the computer system, the current layout comprising a map location of the present configuration data for each of the plurality of components; and
   retrieving the first map location from the current layout.

5. The method of claim 1, wherein retrieving a second map location in the memory device of the computer system comprises:
   retrieving an updated layout from updated program code stored in the computer system, the updated layout comprising a map location of the updated configuration data for each of the plurality of components; and
   retrieving the second map location from the updated layout.

6. A computer storage medium having computer-executable instructions stored thereon which, when executed by a computer system, cause the computer system to:
   (a) select one of a plurality of components of the computer system as a current component;
   (b) retrieve a first map location in a memory device of the computer system, the first map location representing the location of present configuration data for the current component;
   (c) retrieve a second map location in a memory device of the computer system, the second map location representing the location of updated configuration data for the current component;
   (d) determine whether the first map location is the same as the second map location for the current component;
   (e) if the first map location matches the second map location for the current component, then select the next component in the plurality of components as the current component;
   (f) if the first map location does not match the second map location for the current component, then copy the present configuration data to the second map location in the memory device, erase the present configuration data from the first map location in the memory device, and to select the next component in the plurality of components as the current component; and to
   (g) repeat the operations (b)-(f) for each of the plurality of components in the computer system.

7. The computer storage medium of claim 6, wherein the present configuration data for the current component comprises a current setup value for the current component in the computer system.

8. The computer storage medium of claim 7, wherein copying the present configuration data to the second map location in the memory device comprises copying the current setup value for the current component to the second map location in the memory device.

9. The computer storage medium of claim 6, wherein retrieving a first map location in a memory device of the computer system comprises:
   retrieving a current layout from the computer system, the current layout comprising a map location of the present configuration data for each of the plurality of components; and
   retrieving the first map location from the current layout.

10. The computer storage medium of claim 6, wherein retrieving a second map location in the memory device of the computer system comprises:
    retrieving an updated layout from updated program code stored in the computer system, the updated layout comprising a map location of the updated configuration data for each of the plurality of components; and
    retrieving the second map location from the updated layout.

11. An apparatus comprising:
   a processor;
   a memory device; and
   one or more components, and
   wherein the memory device stores instructions executable on the processor for
   (a) selecting one of the plurality of the components as a current component,
   (b) retrieving a first map location in the memory device, the first map location representing the location of present configuration data for the current component,
   (c) retrieving a second map location in the memory device, the second map location representing the location of updated configuration data for the current component,
   (d) determining whether the first map location is the same as the second map location for the current component,
   (e) if the first map location matches the second map location for the current component, then selecting the next component in the plurality of components as the current component,
   (f) if the first map location does not match the second map location for the current component, then
      copying the present configuration data to the second map location in the memory device,
      erasing the present configuration data from the first map location in the memory device, and
      selecting the next component in the plurality of components as the current component, and
   (g) repeating the operations (b)-(f) for each of the plurality of components.

12. The apparatus of claim 11, wherein the present configuration data for the current component comprises a current setup value for the current component.

13. The apparatus of claim 12, wherein copying the present configuration data to the second map location in the memory device comprises copying the current setup value for the current component to the second map location in the memory device.

14. The apparatus of claim 11, wherein retrieving a first map location in the memory device comprises:
    retrieving a current layout, the current layout comprising a map location of the present configuration data for each of the plurality of components; and
    retrieving the first map location from the current layout.

15. The apparatus of claim 11, wherein retrieving a second map location in the memory device comprises:
    retrieving an updated layout from updated program code, the updated layout comprising a map location of the updated configuration data for each of the plurality of components; and
    retrieving the second map location from the updated layout.

* * * * *